(12) United States Patent
Kakinuma et al.

(10) Patent No.: US 7,866,430 B2
(45) Date of Patent: Jan. 11, 2011

(54) VEHICLE WITH TWO PARALLEL WHEELS

(75) Inventors: Takekazu Kakinuma, Sumida-ku (JP);
Ikuo Yamano, Yokohama (JP);
Yoshihiro Kawarasaki, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 141 days.

(21) Appl. No.: 12/303,372

(22) PCT Filed: Aug. 29, 2007

(86) PCT No.: PCT/JP2007/067252
§ 371 (c)(1), (2), (4) Date: Dec. 4, 2008

(87) PCT Pub. No.: WO2008/026770
PCT Pub. Date: Mar. 6, 2008

(65) Prior Publication Data
US 2009/0194955 A1    Aug. 6, 2009

(30) Foreign Application Priority Data
Aug. 30, 2006    (JP)    ............................. 2006-234081

(51) Int. Cl.
*B62D 11/02*    (2006.01)
*B62D 61/00*    (2006.01)
*B62B 9/02*    (2006.01)

(52) U.S. Cl. .................. 180/218; 180/6.5; 180/8.3; 280/5.3; 280/5.32

(58) Field of Classification Search .................. 180/6.5, 180/8.1, 8.2, 8.3, 8.4, 8.5, 218; 280/5.2, 280/5.3, 5.32
See application file for complete search history.

(56) References Cited

U.S. PATENT DOCUMENTS

| 2,427,482 A | 9/1947 | Weissman |
| 2,612,379 A | 9/1952 | Vogel |
| 4,132,423 A | 1/1979 | Chant |

(Continued)

FOREIGN PATENT DOCUMENTS

JP    53 73748    6/1978

(Continued)

*Primary Examiner*—Lesley Morris
*Assistant Examiner*—Marc A Scharich
(74) *Attorney, Agent, or Firm*—Oblon, Spivak, McClelland, Maier & Neustadt, L.L.P.

(57) ABSTRACT

A vehicle with two parallel wheels according to the invention has split steps (2L, 2R), a vehicle body, a pair of wheels (4L, 4R) coaxially parallelly arranged, a pair of wheel drive units for independently driving the wheels (4L, 4R), and a pair of step run-on assisting mechanisms (8L, 8R) arranged corresponding to the wheels (4L, 4R) and changing the degree of dependency of step run-on operation. The step run-on assisting mechanisms (8L, 8R) each have an assisting turning member (15) having a circular arc support surface with a curvature radius greater than the radius of the wheel (4L, 4R) and having its turning center in front, in the travel direction, of the rotation center of the wheel, a link member (16) rotatably supporting the assisting turning member (15), and a damper (25, 26) for changing, according to the speed at which the assisting turning member (15) collides with a step, force retaining one end of the link member (16).

9 Claims, 11 Drawing Sheets

U.S. PATENT DOCUMENTS

| | | | | |
|---|---|---|---|---|
| 5,197,558 A | * | 3/1993 | Misawa | 180/8.2 |
| 6,164,398 A | * | 12/2000 | Alber | 180/8.2 |
| 7,445,217 B1 | * | 11/2008 | Price | 280/87.021 |
| 2001/0018992 A1 | * | 9/2001 | Alber | 180/8.2 |
| 2006/0038360 A1 | * | 2/2006 | Negishi | 280/5.2 |

FOREIGN PATENT DOCUMENTS

| | | |
|---|---|---|
| JP | 2001 333940 | 12/2001 |
| JP | 2002 2206 | 1/2002 |
| JP | 6 61504 | 8/2004 |
| JP | 3105824 | 12/2004 |
| JP | 2005 6436 | 1/2005 |
| JP | 2005 125992 | 5/2005 |
| JP | 2005 296606 | 10/2005 |

\* cited by examiner

VEHICLE WITH TWO PARALLEL WHEELS

TECHNICAL FIELD

The present invention relates to a vehicle with two parallel wheels which runs with two parallel-arranged wheels.

In particular, the present invention relates to a vehicle with two parallel wheels equipped with a step run-on assist mechanism to facilitate running on a step.

BACKGROUND ART

For example, Patent document 1 describes a first example of a vehicle with two parallel wheels of such kind in related art. Patent document 1 also describes a wheel used as a component of transfer equipment. A step clearing mechanism described in Patent document 1 is characterized by that "in the step clearing mechanism wherein a leg member having a disk shape or irregular shape periphery of a diameter greater than that of wheels used in the caster touches a step and rotates before the wheels themselves touch the step so that it causes the wheels to rise from the ground and run on the step, wherein the one leg member is arranged at the middle of the two wheels and integrated within the same support frame as that of the wheels, the pivot of the leg member being also supported within the same support frame".

In accordance with the step clearing wheels having such structure of Patent document 1, it produces an advantageous effect that "it allows a compact design by integrally-mounting the leg member of the invention in the middle portion, and thereby solves the problems; therefore, it can be compatible with conventional casters" (Advantageous effect of the invention in the specification) or similar advantageous effects.

Furthermore, Patent document 2 describes a second example of a vehicle with two parallel wheels in related art. Patent document 2 describes a wheelchair capable of safely and reliably overriding a step. The wheelchair described in Patent document 2 is characterized by that "in the wheelchair comprising a frame having a seat for a rider and equipped with pairs of front wheels and rear wheels, the wheelchair further comprises a footrest having substantially the same width as the wheelchair, the footrest comprising an upper side where the rider puts its feet and an under side contact surface for contacting the corner of a step, the footrest being located between the front wheels and mounted on the frame through a substantially horizontal pivot, the pivot being perpendicular to the moving direction of the wheel chair, and the footrest being rotatable between the regular position where the contact surface is located in front of the front wheels and retract position where the contact surface intersects with the lower periphery of the front wheel".

In accordance with the wheel chair having such structure of Patent document 2, it produces an advantageous effect that "when the rider drives the rear wheels after the wheel chair moves forward until the contact surface contacts the corner of a step with the footrest being in the regular position, the footrest is retract to the retract position against a bias mean so that the front wheels can run on the step, and thereby the rider can further drive the rear wheels to move the entire wheel chair above and past the step" (Paragraph [0021] in the specification) or similar advantageous effects.

Furthermore, Patent document 3 describes a third example of a vehicle with two parallel wheels of in related art. Patent document 3 describes a free wheel used as a front wheel capable of smoothly clearing a step and lessening the impact caused by the contact with the step. The step clearing wheel described in Patent document 3 is characterized by that "in a free wheel for a self-propelled vehicle or a carriage, a main wheel is arranged eccentrically by an pivot, and support wheels are arranged ahead of the main wheel on the left and right sides; and the step clearing wheel further comprises a cushion device for lessening the impact caused by the contact with the step".

In accordance with the step clearing wheel of Patent document 3, it produces an advantageous effect that "when the wheel encounters a step, the support wheels first hit the step, position the main wheel body perpendicularly to the step, and then runs on the step; at this point, the main wheel (2) does not sustain the weight, and the main wheel (2) starts to run on the step from the position where the support wheels (3) is raised from the ground; furthermore, it clears the step using the cushion to lessen the impact occurring from the contact to the step; and therefore, when it is used for a wheelchair, is can clear a step by forward propulsion force alone regardless of the size of a step" (Paragraph [0006] in the specification) or similar advantageous effects.

[Patent document 1] Japanese unexamined patent application publication No. 2002-2206

[Patent document 2] Japanese unexamined patent application publication No. 2005-296606

[Patent document 3] Japanese utility model registration No. 3105824

However, the step clearing wheel of Patent document 1 is used as a component for transfer equipment. In other word, it is used as a support wheel for clearing a step in a vehicle such as a wheelchair and a baggage transfer vehicle which has 3 or 4 wheels. Furthermore, the wheelchair of Patent document 2 relates to a four-wheel vehicle (wheelchair) which has two front wheels of a smaller diameter and two rear wheels of a larger diameter, and particularly, relates to a wheelchair having a step clearing means capable of sufficiently sustaining the load during the step clearing action. Furthermore, Patent document 3 describes a front free wheel which enables a wheelchair or a handcart to smoothly clear a step and lessens the impact by a cushion.

Since there is no situation where all wheels run on a step at the same time in such three or four wheel vehicle, it can relatively easily clear the step by dividing the vehicle weight between wheels over the step and wheels under the step and producing the driving force at the driving wheels depending on the weight ratio. However, in the case of vehicle with two parallel wheels which runs with parallel-arranged two wheels, all wheels may run on a step simultaneously when the vehicle encounters the step. In such case, it requires enough driving force to run on the step while sustaining the full weight of the vehicle. Therefore, there has been a problem that it requires torque three or four times as large as that needed when driving on a flat place, and thereby requires a driving source capable of producing large driving force.

At this point, it is conceivable that a step run-on mechanism such as those described in Patent document 1-3 may be applied to a vehicle with two parallel wheels. However, there is a problem that when such kind of step run-on assist mechanisms is used in a two wheeled vehicle, the driving wheel will be raised from the ground and spin freely without pushing the ground during a step run-on process. Furthermore, in the case of the step run-on mechanism of Patent document 3, a gas spring is used between the distal end of the arm and the wheel mounting fixture. However, the gas spring is used just for lessening the impact occurring from the contact and is not used for any other purposes.

DISCLOSURE OF THE INVENTION

Problems to be Solved by the Invention

One of problems the present invention tries to solve is that there has been no step run-on assist mechanism to enable a vehicle with two parallel wheels to easily run on a step and smoothly travel on a road surface having steps. Meanwhile, there have been some step run-on assist mechanisms for vehicles other than vehicles with two parallel wheels, e.g., four wheel vehicles such as a wheelchair. However such step run-on assist mechanisms cannot be directly applied to a vehicle with two parallel wheels because there is a problem that the driving wheel(s) will be raised from the ground and spin freely without pushing the ground during a step run-on action.

Means for Solving the Problem

A vehicle with two parallel wheels in accordance with the most important aspect of the present invention includes: a step base where a driver rides on; a vehicle body for supporting the step base; a pair of wheels coaxially arranged in parallel to each other and rotatably supported on the vehicle body; a pair of wheel drive portions for independently rotating the pair of wheels; and a pair of step run-on assist mechanisms for changing the degree of the dependence of the step run-on action depending on the collision speed to a step, each of the pair of step run-on assist mechanisms being provided for each of the pair of wheels. Each of the pair of step run-on assist mechanisms includes: an assisting turning member having a circular support surface of a curvature radius larger than that of the wheels, the turning center of the assisting turning member being arranged ahead of the rotating center of the wheels in the travel direction of the vehicle; a link member for rotatably supporting the assisting turning member such that the turning center of the assisting turning member is perpendicular to the travel direction of the vehicle, one end of the link member being rotatably supported on the step base or the vehicle body; and a retaining force changing device for changing the amount of a force for retaining the other end of the link member depending on the collision speed of the step run-on mechanism to the step.

Advantageous Effects of the Invention

A vehicle with two parallel wheels in accordance with one aspect of the present invention includes a step base, a vehicle body, and a pair of wheel drive portions, and a pair of step run-on assist mechanisms, and each of the pair of step run-on assist mechanisms includes an assisting turning member, a link member, and retaining force changing device. Therefore, when the vehicle speed is low (under predetermined speed) and the vehicle does not have sufficient inertial force to raise the vehicle upward as the vehicle runs into a step, the resisting force of the retaining force changing device is eliminated or reduced, and the pair of the wheels run on the step by the driving force of the pair of wheels alone. On the other hand, when the vehicle speed is high (equal to or larger than the predetermined speed) and the vehicle has sufficient inertial force to raise the vehicle upward as the vehicle runs into a step, the resisting force of the retaining force changing device is increased to retain the link member at the existing position, and the pair of wheels run on the step by using the assisting turning member. As explained above, the characteristic of the assisting turning member is changed depending on the vehicle speed during the collision to a step, so that the wheels run on the step by the driving force of the wheels when the vehicle speed is low, and run on the step by using the assisting turning member when the vehicle speed is high. In this manner, it can provide a vehicle with two parallel wheels capable of facilitating to run on a step and smoothly running on the step with relatively small driving torque.

DESCRIPTION OF REFERENCE NUMERALS

1: vehicle with two parallel wheels; 2L, 2R: split steps (step base); 3: vehicle body; 4L, 4R: wheels; 5L, 5R: wheel drive units (wheel drive portions); 7: handle; 8L, 8R: step run-on assist mechanisms; 15: assisting turning member; 16: link member; 17: damper (retaining force changing device); 18: coil spring (biasing member); 21: contact portion (arc-shaped support surface); 23 turning shaft; 24: supporting shaft; 29: connect pin; 31L, 31R: wheel drive circuits; 32: attitude detecting unit; 37: turning state detecting device; 24L, 24R: turning angle detecting devices; 40: control device; and ST: step

BEST MODE FOR CARRYING OUT THE INVENTION

An assisting turning member having a circular support surface of a curvature radius larger than that of the wheels are arranged such that the turning center of the assisting turning member is ahead of the rotating center of the wheels in the travel direction of the vehicle. The assisting turning member is rotatably supported by a link member, one end of which is rotatably supported on a step base or a vehicle body. Furthermore, the other end of the link member is supported on a retaining force changing device capable of changing the retaining force depending on the collision speed of the assisting turning member to a step. With this structure, it can achieve a vehicle with two parallel wheels capable of easily running on a step and easily traveling on a road surface having steps.

Figure 1A:
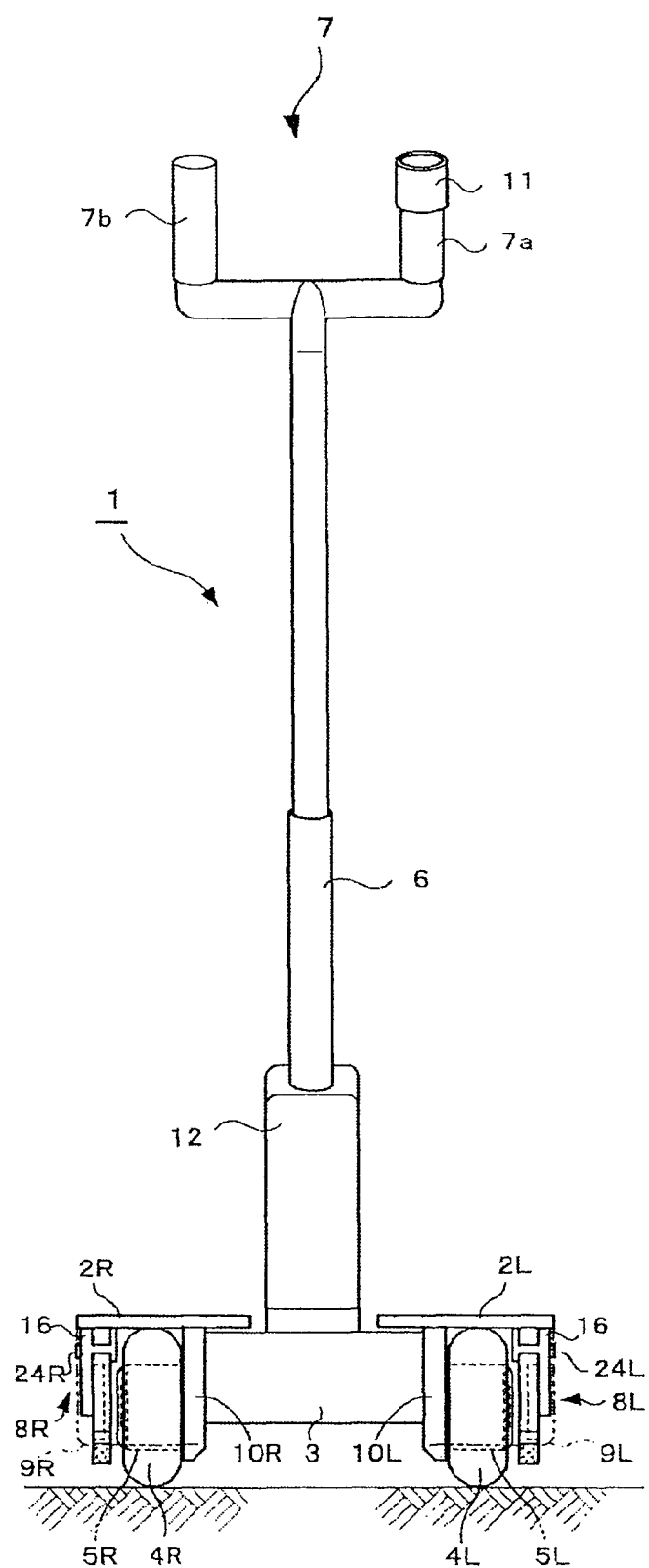
FIG. 1A is a front view of a vehicle with two parallel wheels in accordance with a first embodiment of the present invention.
Figure 1B:
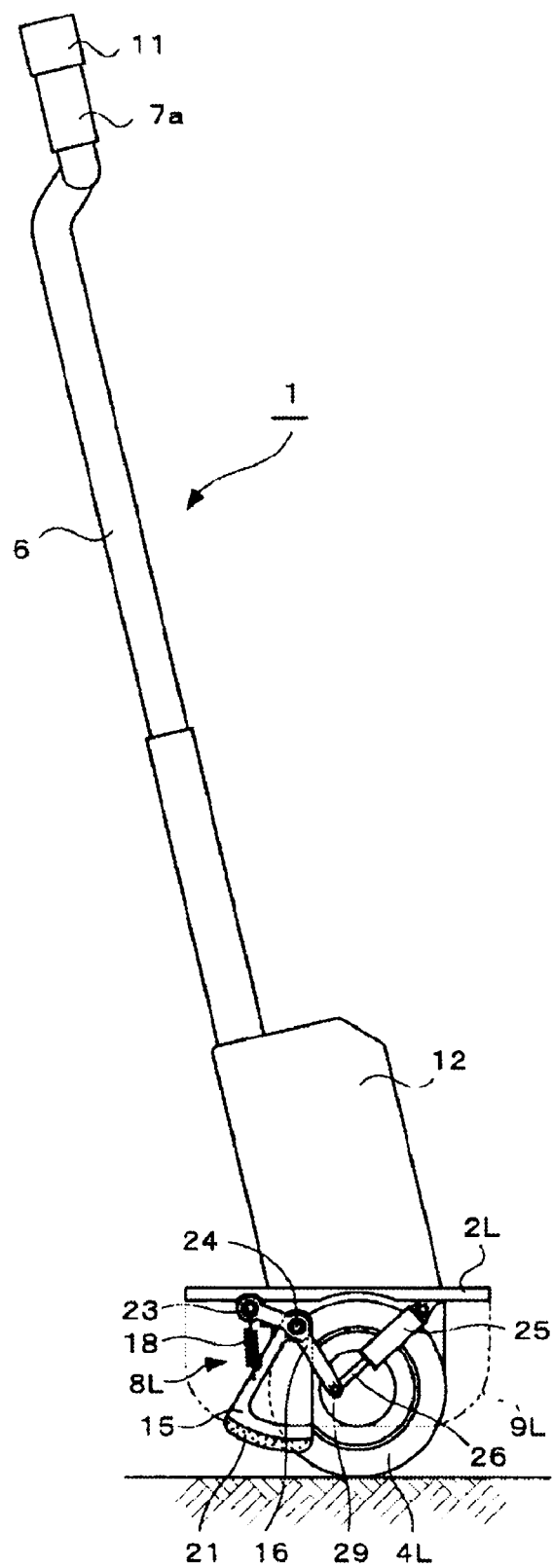
FIG. 1B is a side view of a vehicle with two parallel wheels in accordance with a first embodiment of the present invention.
Figure 2A:
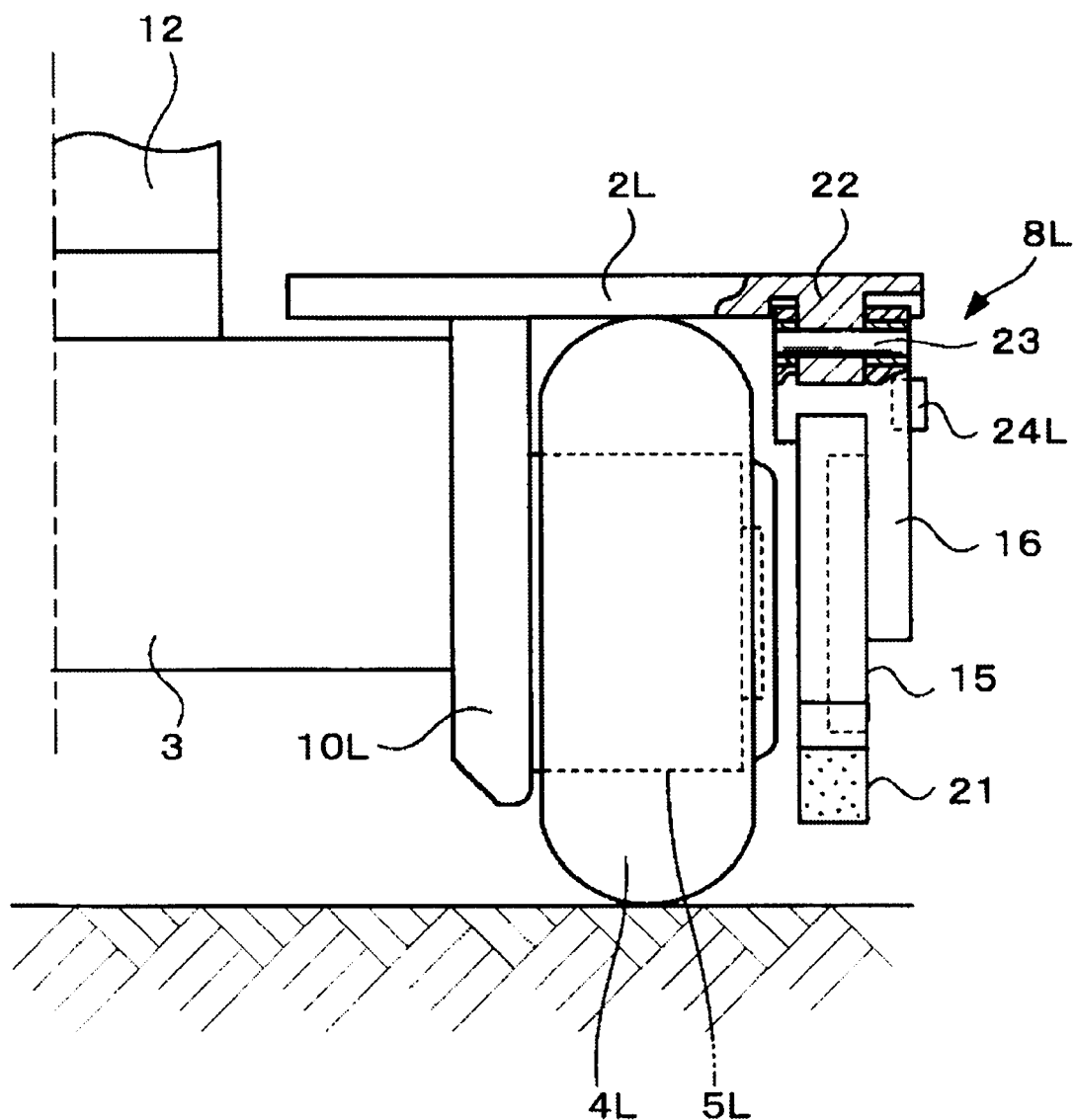
FIG. 2A is an enlarged view of a main part of FIG. 1A showing a main part of the vehicle with two parallel wheels of FIGS. 1A and 1B.
Figure 2B:
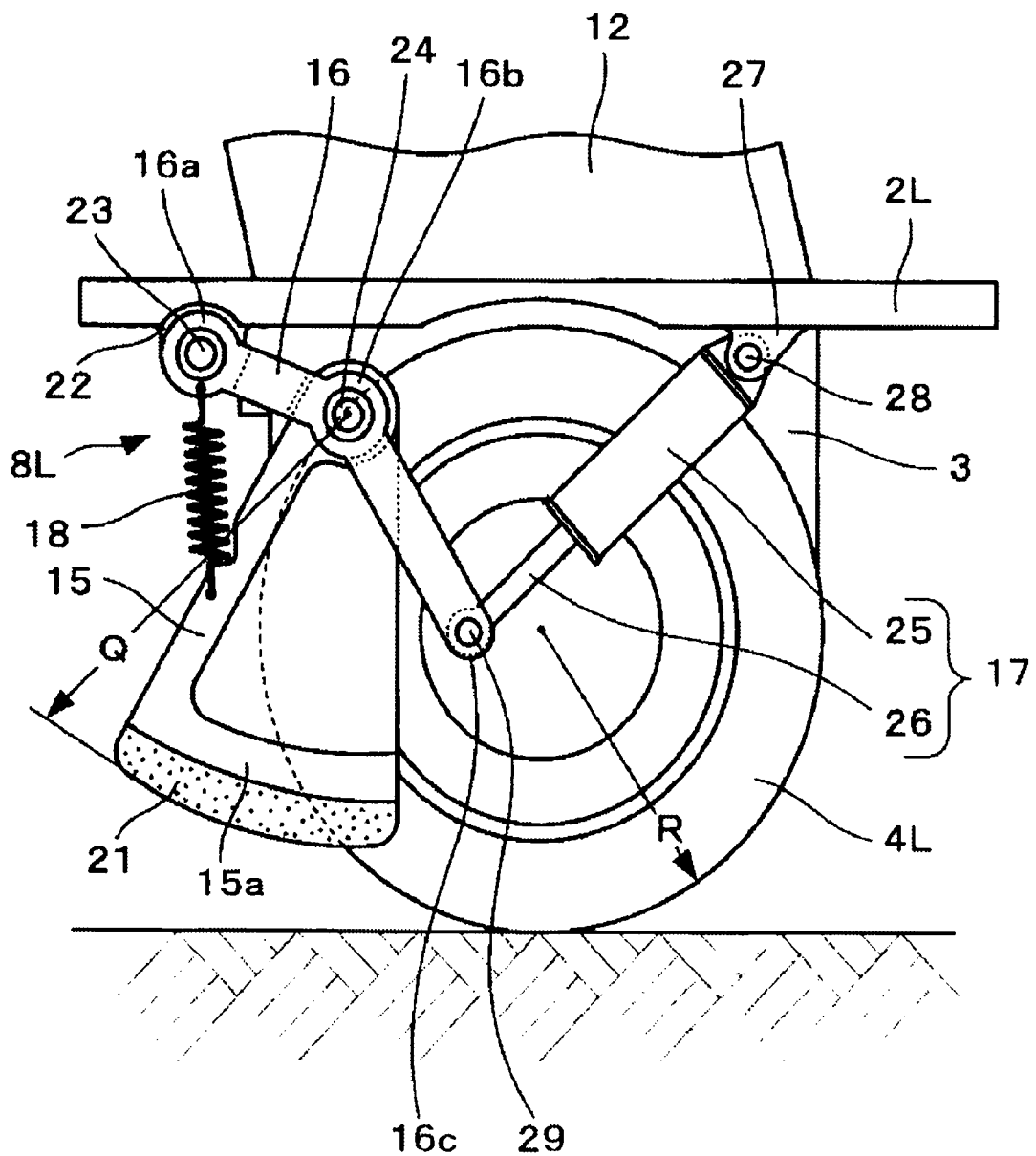
FIG. 2B is an enlarged view of a main part of FIG. 1B showing a main part of the vehicle with two parallel wheels of FIGS. 1A and 1B.
Figure 3:
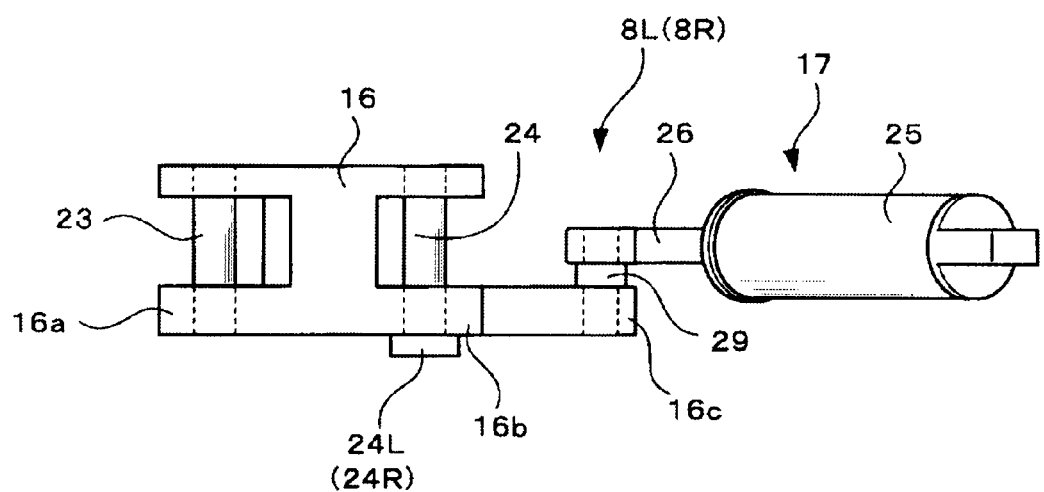
FIG. 3 is a plan view of a link member and a damper in the step run-on mechanism of the vehicle with two parallel wheels shown in FIGS. 1A and 1B.
Figure 4A:
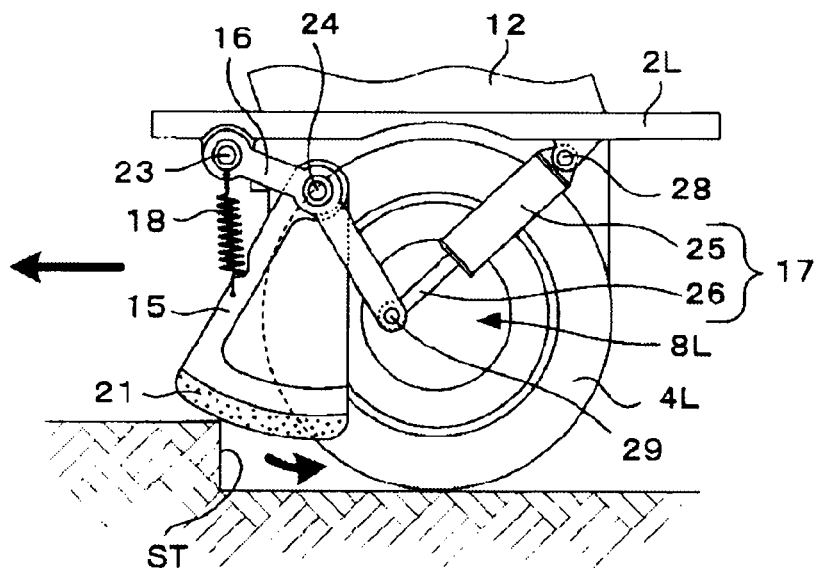
FIG. 4A is an explanatory diagram showing the state of the vehicle with two parallel wheels of FIGS. 1A and 1B before step run-on action for explaining the behavior and the like of the step run-on mechanism while the vehicle with two parallel wheels is traveling at high speed.
Figure 4B:
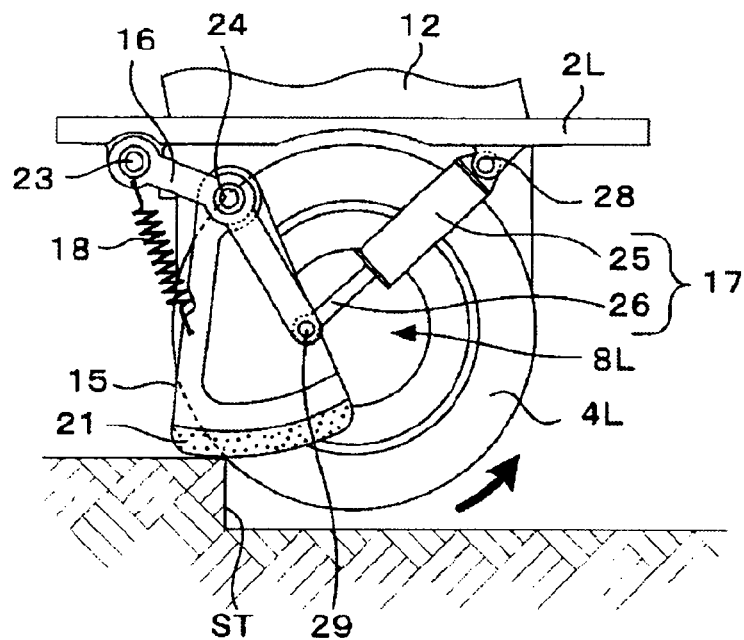
FIG. 4B is an explanatory diagram showing the state of the vehicle with two parallel wheels of FIGS. 1A and 1B during the step run-on action for explaining the behavior and the like of the step run-on mechanism while the vehicle with two parallel wheels is traveling at high speed.
Figure 4C:
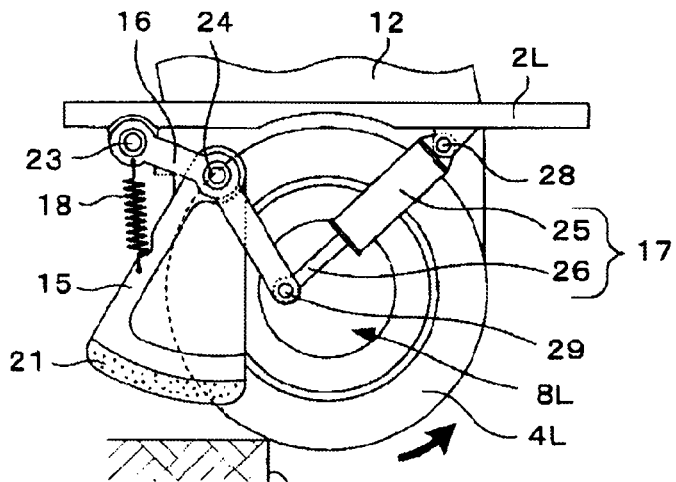
FIG. 4C is an explanatory diagram showing the state of the vehicle with two parallel wheels of FIGS. 1A and 1B after the step run-on action for explaining the behavior and the like of the step run-on mechanism while the vehicle with two parallel wheels is traveling at high speed.
Figure 5A:
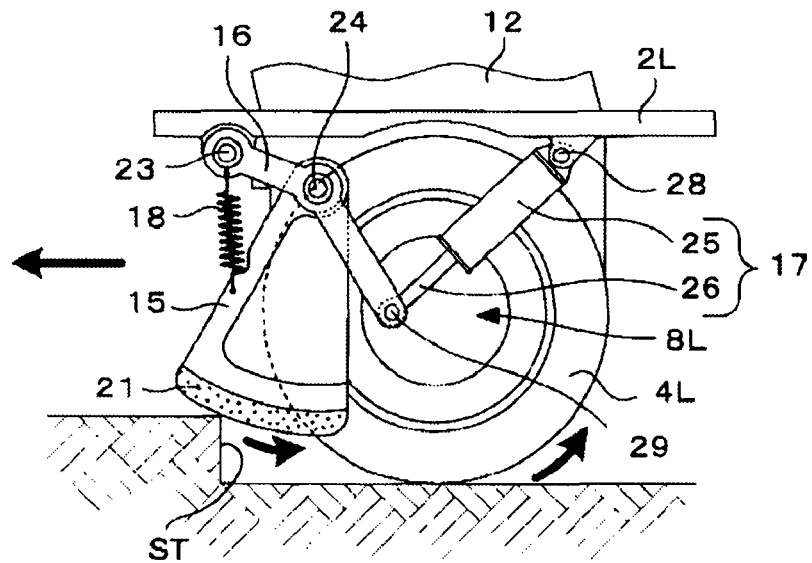
FIG. 5A is an explanatory diagram showing the state of the vehicle with two parallel wheels of FIGS. 1A and 1B before step run-on action for explaining the behavior and the like of the step run-on mechanism while the vehicle with two parallel wheels is traveling at low speed.
Figure 5B:
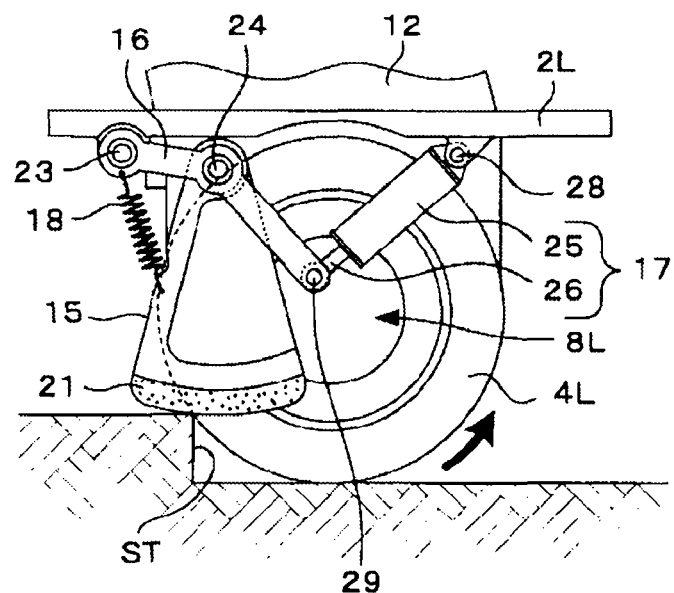
FIG. 5B is an explanatory diagram showing the state of the vehicle with two parallel wheels of FIGS. 1A and 1B during the step run-on action for explaining the behavior and the like of the step run-on mechanism while the vehicle with two parallel wheels is traveling at low speed.
Figure 5C:
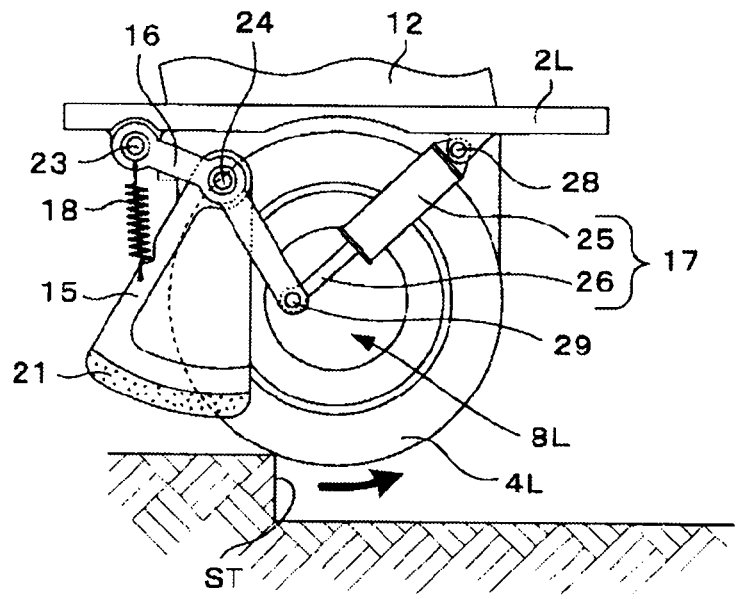
FIG. 5C is an explanatory diagram showing the state of the vehicle with two parallel wheels of FIGS. 1A and 1B after the step run-on action for explaining the behavior and the like of the step run-on mechanism while the vehicle with two parallel wheels is traveling at low speed.
Figure 6:
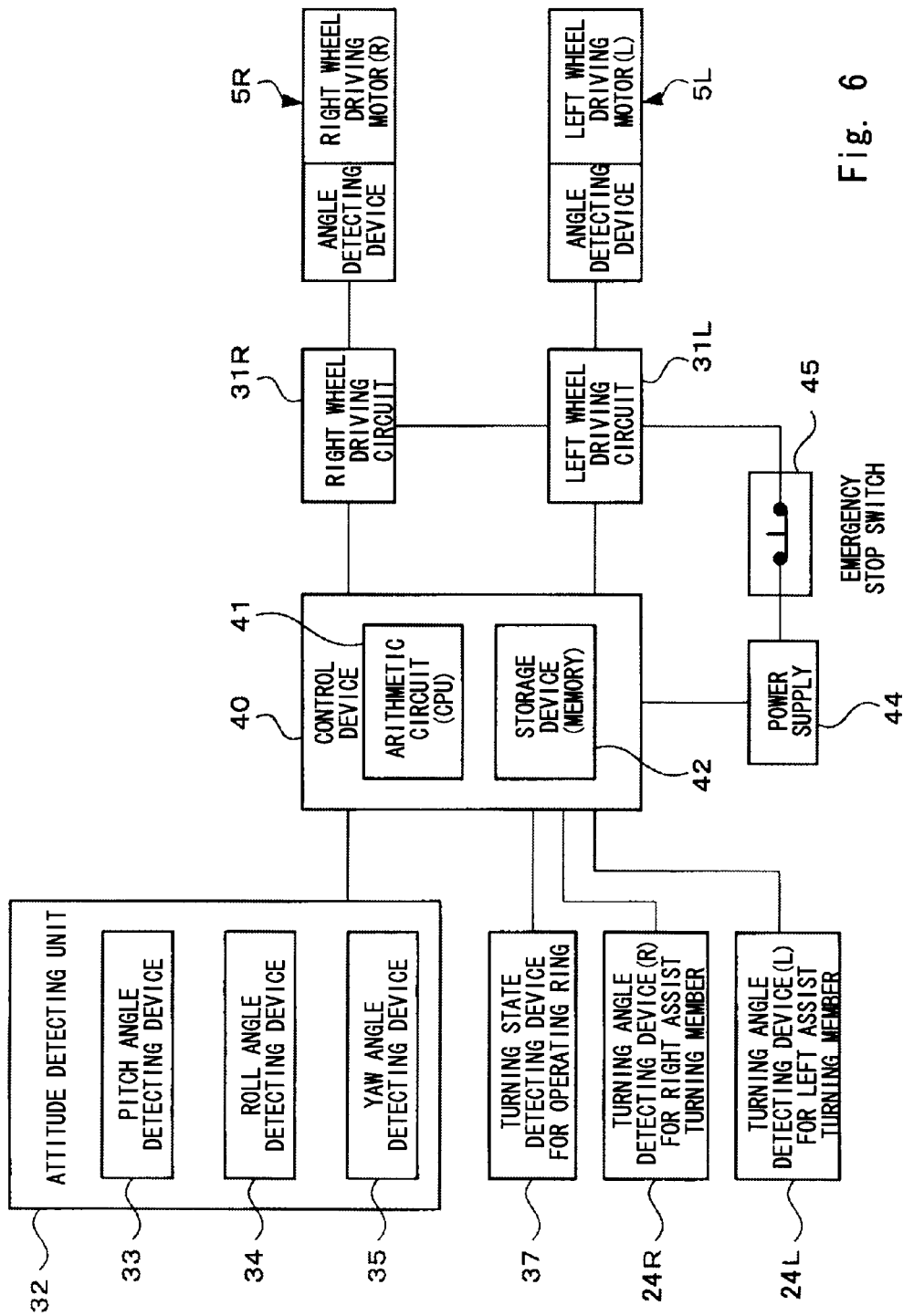
FIG. 6 is a block diagram showing a general structure of a control device in accordance with the first embodiment of a vehicle with two parallel wheels of the present invention.
Figure 7:
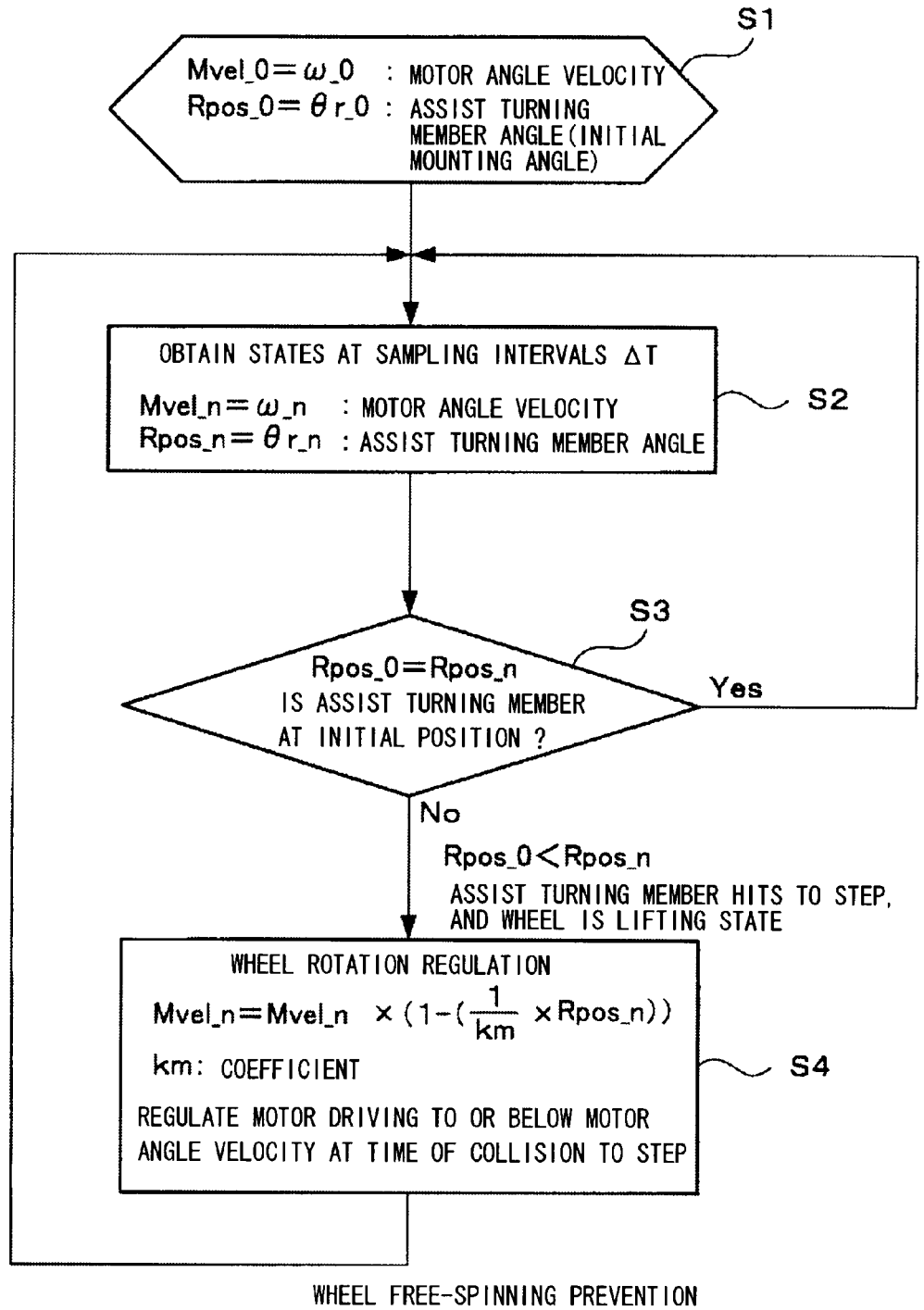
FIG. 7 is a flowchart of interruption process for performing a wheel free-spinning prevention control by the control device.

Embodiments of the present invention are explained hereinafter with reference to the drawings. FIGS. 1A-7 show embodiments of the present invention as examples. That is; FIGS. 1A and 1B are a front view and a side view respectively of a vehicle with two parallel wheels in accordance with a first embodiment of the present invention, FIGS. 2A and 2B are enlarged views of main parts of FIGS. 1A and 1B respectively, FIG. 3 is a plan view showing linking relation between a link member and a retaining force changing device, FIGS. 4A-4D are explanatory diagrams showing step run-on action at high speed, FIGS. 5A-5D are explanatory diagrams showing step run-on action at low speed, FIG. 6 is a block diagram showing a general structure of a control device of a vehicle with two parallel wheels in accordance with the first embodiment, and FIG. 7 is a flowchart of a wheel free-spinning prevention by the control device.

As shown in FIGS. 1A and 1B, a vehicle with two parallel wheels in accordance with a first embodiment of the present invention includes two split steps 2L and 2R as an example of a step base where a driver ride on, a vehicle body 3 firmly supporting each of the split steps 2L and 2R in a horizontal position, a pair of wheels 4L and 4R rotatably supported on the vehicle body 3, a pair of wheel drive units 5L and 5R as an example of wheel drive portions for independently rotating the pair of wheels 4L and 4R, a handle post 6 standing at substantially the center part of the vehicle body 3, a handle 7 fixed on the upper end of the handle post 6, a pair of step run-on assist mechanisms 8L and 8R, each corresponding to respective one of the pair of wheels 4L and 4R, a pair of wheel covers 9L and 9R, each corresponding to respective one of the wheels 4L and 4R, and the like.

The two split steps 2L and 2R are formed as a pair of flat board elements having a size as large as or slightly larger than a human foot such that a driver can put each of his/her foot on respective one of the split steps 2L and 2R. The vehicle body 3 is formed as a single hollow housing containing a control device, an attitude detecting unit, and the like which are explained later. A pair of unit mounting portions 10L and 10R is arranged on the both left and right sides of the vehicle body 3 in width direction. Wheel drive units 5L and 5R are mounted on respective ones of the pair of unit mounting portions 10L and 10R such that each wheel drive unit faces and extends outward direction.

Each of the wheel drive units 5L and 5R includes a stepping motor and its driving circuit, a speed reducer, and the like. Furthermore, left and right wheels 4L and 4R are mounted on the rotating portion of their respective wheel drive units 5L and 5R. The left and right wheels 4L and 4R are coaxially arranged in parallel to each other. By driving independently each of the pair of wheel drive units 5L and 5R, each of the wheels 4L and 4R is independently rotated. During this action, when the rotation speeds of both of the left and right wheels 4L and 4R are matched with each other, the vehicle will travel straight, and when the rotation speeds of the left and right wheels 4L and 4R are changed from one another, the vehicle will turn to the side which has lower rotation speed.

The handle post 6 is mounted on the upper surface of the vehicle body 3 at its lower end, and integrally provided on the vehicle body 3. The upper portion of the handle post 6 extends upward with slight inclination to the forward direction, and the middle part of the U-shaped handle 7 is connected on the upper end of the handle post. Protruding portions extend upward from the both ends of the handle 7, and serve as gripping portions 7a and 7b. Furthermore, a rotatable manipulation ring 11, which can be used to control the driving of the pair of wheel drive units 5L and 5R, is rotatably mounted on the upper end of one of the gripping portions 7a and 7b of the handle 7.

The rotatable manipulation ring 11 is used to manually control the turning behavior of the vehicle, and acts as an accelerator ring for the turning action. When a driver rotates this rotatable manipulation ring 11 in a direction the driver intends to turn the vehicle, a signal corresponding to the amount of the rotation of the rotatable manipulation ring 11 will be fed to a control device (which is explained later). Then, the control device controls the driving of the pair of wheel drive units 5L and 5R in response to the signal to change the rotations of the left and right wheels 4L and 4R from one another so that the vehicle can make a turn at desired turning speed.

Furthermore, a power supply containing portion 12 containing batteries (not shown) as an example of a power supply is located at the bottom of the handle post 6 on the upper surface of the vehicle body 3 for supplying electrical power to the pair of wheel drive units 5L and 5R, the control device, and other electronic or electrical devices. In this embodiment, the power supply containing portion 12 is formed as a cartridge, and can contain a plurality of batteries. However, it should be understood that the power supply is not limited to batteries shown in this embodiment, and other power supplies such as a portable storage battery and a fuel cell may be used as the power supply. The power supply containing portion 12 is covered with a power supply cover to prevent rain water, dust, and the like from infiltrating into the power supply.

Left and right step run-on assist mechanisms 8L and 8R which correspond to the left and right wheels 4L and 4R respectively are arranged on the under surfaces of the pair of the split steps 2L and 2R respectively that are fixed to the vehicle body 3. The step run-on assist mechanisms 8L and 8R may be arranged on the outside of their respective wheels 4L and 4R, or arranged on the inside of their respective wheels 4L and 4R. In this embodiment, the step run-on assist mechanisms 8L and 8R are arranged on the outside of their respective wheels 4L and 4R. The reason for this arrangement is that it is more clearly illustrated in the figure when the step run-on assist mechanisms 8L and 8R are arranged on the outside, and it allows easier explanation. On the other hand, when the step run-on assist mechanisms 8L and 8R are arranged on the inside of their respective wheels 4L and 4R, the wheels 4L and 4R will act as protection for the step run-on assist mechanisms 8L and 8R. Therefore, for example, even if the vehicle collides with a step in a diagonal direction, it will prevent the load from being applied to the side of the step run-on assist mechanisms 8L and 8R.

The pair of step run-on assist mechanisms 8L and 8R is symmetric in a width direction in its shape and structure. Therefore, only the step run-on mechanism 8L for the left wheel 4L is explained hereinafter as a representative explanation. As shown in FIGS. 2A, 2B, and 3, step run-on mechanism 8L includes a assisting turning member 15, a link member 16, a damper 17 as an example of a retaining force changing device, and a coil spring 18 as an example of a biasing member.

The assisting turning member 15 is composed of a fan-shaped board member having a pivotal hole formed at the pivot part thereof, and turns around the pivotal hole. The opposite side of the assisting turning member 15 to the pivotal hole is formed as a circular arc 15a. Since the assisting turning member 15 is constructed on the precondition that it will often collides to a step on a road surface, it is formed from a relatively heavy and robust material, e.g., metal such as cast iron or aluminum. A contact portion 21 having an arc-shaped support surface which will contact a step is arranged on the circular arc 15a of the assisting turning member 15. The curvature radius Q of the arc-shaped support surface of the contact portion 21 is larger than the radius R of the left wheel 4L (Q>R). The contact portion 21 is used to absorb and lessen the impact occurring when the assisting turning member 15 collides a step, and formed from, for example, a buffer material such as hard rubber.

The assisting turning member 15 having such structure is rotatably supported on the link member 16 by a supporting shaft 24. The link member 16 is used to support the assisting turning member 15 on the vehicle body 3 or the split step 2L (2R) in such manner that the assisting turning member 15 is rotatable and adjustable in its vertical position to the vehicle body 3 or the split step 2L (2R). To this end, a first bearing portion 16a is arranged at the one end of the link member 16 in the longitudinal direction to rotatably support the link member 16 on the split step 2L. A second bearing portion 16b is arranged at the middle of the link member 16 in the longitudinal direction to support the assisting turning member 15. Furthermore, a third bearing portion 16c is arranged at the other end of the link member 16 in the longitudinal direction to connect to the damper 17.

As shown in FIG. 3, the first bearing portion 16a and second bearing portion 16b are composed of two joint-like portions, each of which have two bearing pieces in U-shape and joined with each other on the opposite side to the U-shaped side such that the U-shaped sides of both joint-like portions face opposite outward directions. Furthermore, one of the bearing pieces of the second bearing portion 16b is extending in the opposite direction to the first bearing portion 16a and bending in dogleg shape, and the third bearing portion 16c is formed at the other end of this bearing piece. A first bearing convex portion 22 which is formed on the under surface of the split step 2L engages between the bearing pieces of the first bearing portion 16a. A pivotal hole is formed in the first bearing convex portion 22, and corresponding pivotal holes are formed in the two bearing pieces of the first bearing portion 16a. A turning shaft 23 is passing through these pivotal holes, and one end of the link member 16 is rotatably supported on the split step 2L with this turning shaft 23.

The assisting turning member 15 is rotatably supported on the second bearing portion 16b of the link member 16 by a supporting shaft 24. That is, the pivot part of the assisting turning member 15 is sandwiched between the bearing pieces of the second bearing portion 16b, and a supporting shaft 24 is passing through the pivotal hole of the two bearing pieces of the second bearing portion 16b and the pivotal hole of the assisting turning member 15. The supporting shaft 24 is, for example, press-fitted into the pivotal hole of the assisting turning member 15 with both ends protruding from both sides of the assisting turning member 15, and the two bearing pieces of the second bearing portion 16b holds the both ends of supporting shaft 24.

A spring retaining hole for retaining one end of the coil spring 18 is formed on one side of the assisting turning member 15. The coil spring 18, one end of which is retained at this spring retaining hole, is a tension coil spring generating bias force in a tensile direction. The other end of the coil spring 18 is retained at a spring retaining hole formed on the first bearing portion 16a of the link member 16. The assisting turning member 15 is continuously pulled in the forward direction of the travel direction of the vehicle by the tensile force of the coil spring 18. Meanwhile, the base portion of the second bearing portion 16b is preventing the turning motion of the assisting turning member 15 in the forward direction (travel direction) of the vehicle.

A turning angle detecting device 24L (24R) for detecting the turning angle of the assisting turning member 15 is coaxially arranged with respect to the supporting shaft 24. The detecting device 24L (24R) is composed of a shaft portion fixed to the supporting shaft 24, and a detecting portion for detecting relative amount of rotational displacement to the shaft portion. For example, a potentiometer or a sensor using variable capacitor structure may be used for this detecting device 24L (24R). The detecting device 24L (24R) can detect the turning angle of the assisting turning member 15 caused by the collision of the assisting turning member 15 to a step by using the characteristic that the resistance value changes depending on the amount of rotational displacement between the shaft portion and detecting portion.

The damper 17 includes a cylinder 25 filled with a liquid medium such as oil or water, and a piston rod 26 or the like. One end of the piston rod 26 is connected to a piston which is slidably supported within the cylinder 25, and the other end of the piston rod 26 is externally protruding from one end face of the cylinder 25. The other end face of the cylinder 25 is rotatably supported in a second bearing convex portion 27 formed on the under surface of the split step 2L by a support pin 28. Furthermore, the distal end of the piston rod 26 is rotatably connected to the third bearing portion 16c of the link member 16, which is extending in a diagonal direction of the vehicle, by a connect pin 29.

The damper 17 changes the amount of force for retaining the third bearing portion 16c of the link member 16 depending on the collision speed of the assisting turning member 15 to a step. That is, the damper 17 will lock the piston by the viscosity of the liquid medium contained within the cylinder 25 when the speed of the vehicle during the collision of the contact portion 21 of the assisting turning member 15 to a step is equal to or higher than predetermined speed. In this manner, it secures the damper 17 as a whole, and holds the link member 16 at the existing position. As a result, the degree of the dependence to the step run-on assist mechanisms 8L and 8R during the step run-on action becomes larger, and thereby the step run-on action is performed by using the step run-on assist mechanisms 8L and 8R.

On the other hand, when the speed of the vehicle during the collision of the contact portion 21 of the assisting turning member 15 to a step is lower than the predetermined speed, the viscosity of the liquid medium contained within the cylinder 25 becomes very small, and thereby the piston becomes substantially free-moving state and moves easily within the cylinder 25. That is, the damper 17 reduces the force for retaining the link member 16, enabling the retracting action of the damper 17, and allowing the turning action of the link member 16. As a result, the degree of the dependence to the step run-on assist mechanisms 8L and 8R during the step run-on action becomes smaller, and thereby the step run-on action is performed by the driving force of the wheels 4L and 4R alone.

That is, the piston rod 26 slides into the cylinder 25 depending on the degree of collision force of the assisting turning member 15 to a step. In this manner, the link member 16 rotates around the turning shaft 23 toward a backward direction of the vehicle, and the assisting turning member 15 is raised upward depending on the turning amount of the link member 16. In this case, although the contact portion 21 of the assisting turning member 15 contacts the step, the repulsive force from the step is absorbed by the upward movement of the link member 16, and thereby most of the load exerted on the vehicle remains to be exerted on the two wheels 4L and 4R. Therefore, the vehicle continues to travel by the two wheels 4L and 4R, and the two wheels 4L and 4R collide the step and run on the step by the driving force of the wheels 4L and 4R.

Figure 4D:
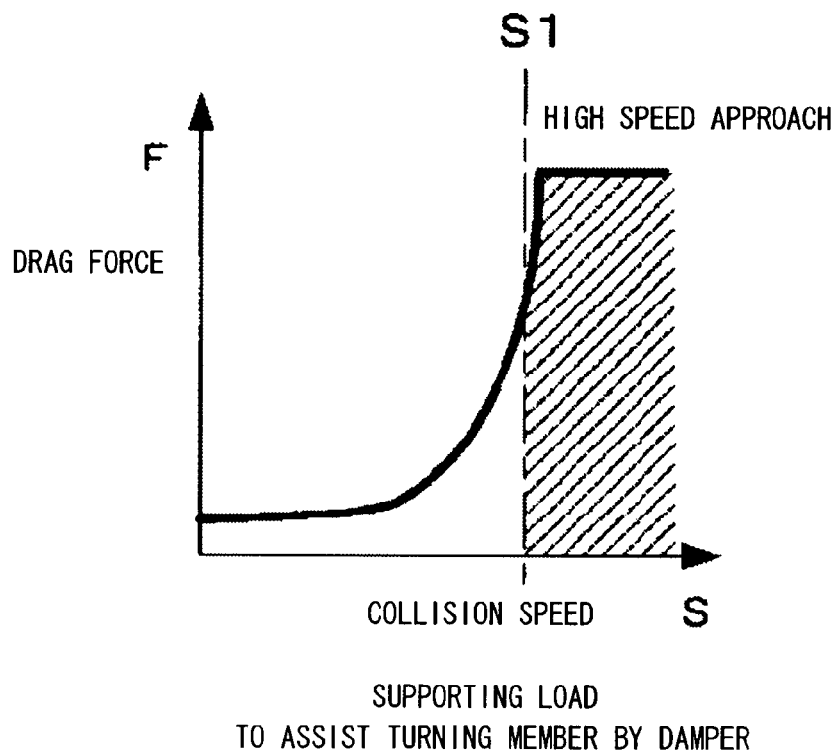
FIG. 4D is an explanatory graph showing the supporting load of the assisting turning member supported by the damper for explaining the behavior and the like of the step run-on mechanism while the vehicle with two parallel wheels is traveling at high speed.
Figure 5D:
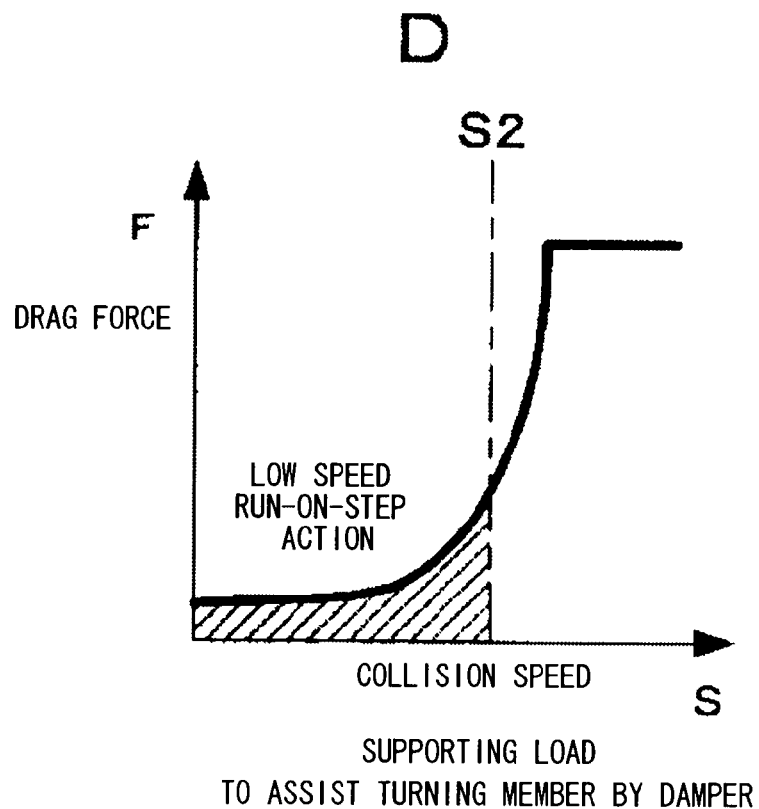
FIG. 5D is an explanatory graph showing the supporting load of the assisting turning member supported by the damper for explaining the behavior and the like of the step run-on mechanism while the vehicle with two parallel wheels is traveling at low speed.

FIGS. 4D and 5D show the retaining characteristics of the assisting turning member 15 by the damper 17. FIGS. 4D and 5D show graphs of the relation between the speed S at the collision of the assisting turning member 15 to a step and the drag force F received by the assisting turning member 15 at that moment. Among them, FIG. 4D shows the change in the retaining force for the assisting turning member 15 by the damper 17 when the vehicle collides a step at high speed equal to or higher than predetermined speed. In this case, when the collision speed S1 is high speed equal to or higher than predetermined speed, the retaining force becomes very large, and damper 17 is substantially locked. On the other hand, FIG. 5D shows the change in the retaining force for the assisting turning member 15 by the damper 17 when the vehicle collides a step at low speed lower than the predetermined speed. In this case, when the collision speed S2 is low speed lower than the predetermined speed, the retaining force becomes very small, and damper 17 is substantially free-moving state.

The term "speed, at which the assisting turning member 15 collides to a step, being equal to or higher than predetermined speed" means speed higher than the collision speed S1 shown in FIG. 4D. Furthermore, the term "speed, at which the assisting turning member 15 collides to a step, being smaller than predetermined speed" means speed equal to or lower than the collision speed S2 shown in FIG. 5D.

The wheel covers 9L and 9R are arranged on the outside of the step run-on assist mechanisms 8L and 8R having such structure, and acts as a shield for the step run-on assist mechanisms 8L and 8R. As shown by phantom lines in FIGS. 1A and 1B, each of the wheel covers 9L and 9R is fixed at its respective outer edge of the split steps 2L and 2R at the upper edge, and extending downward from there and forming a portion covering the step run-on assist mechanisms 8L and 8R. In this case, the lower parts of the wheels 4L and 4R and the lower parts of the assisting turning member 15 (mainly, contact portion 21) are exposed below the wheel covers 9L and 9R.

Furthermore, the vehicle body 3 contains a left wheel drive circuit 31L and a right wheel drive circuit 31R, which separately drive the pair of wheel drive units 5L and 5R respectively or the likes, an attitude detecting unit 32 for detecting the attitudes of the vehicle body 3, handle 7 (or handle post 6), and the like, and outputting their detection signals, and a control device 40 for outputting a control signal to control the driving of the pair of the wheel drive units 5L and 5R or the like.

As shown in FIG. 6, the attitude detecting unit 32 includes a pitch angle detecting device 33 for detecting the pitch angle of vehicle body 3, a roll angle detecting device 34 for detecting the roll angle of vehicle body 3, a yaw angle detecting device 35 for detecting the yaw angle of vehicle body 3, and an accelerometer for detecting the accelerations in three axes (e.g., X-axis: travel direction, Y-axis: a direction orthogonal to the travel direction in a horizontal plane, and Z-axis: a direction orthogonal to the travel direction in a vertical plane). Gyro-sensors may be used for the pitch angle detecting device 33, roll angle detecting device 34, and yaw angle detecting device 35.

A gyro-sensor is a sensor capable of detecting at least one angle velocity in regard to a pitch axis of the vehicle body 3 (axis corresponding to the axle shaft of the pair of wheels 4L and 4R), a roll axis (axis passing through the center of the vehicle body 3 and parallel to the travel direction of the vehicle), and a yaw axis (axis passing through the center of the vehicle body 3 and orthogonal to the road surface on which the vehicle is traveling). Furthermore, the accelerometer of the attitude detecting unit 32 detects acceleration in regard to at least one axis when the vehicle body 3 is expressed in three axes (X-axis, Y-axis, and Z-axis). Incidentally, the pitch angle means a turning angle of the vehicle body 3 in the back-and-forth direction around the pitch axis. The roll angle means a turning angle of the vehicle body 3 in the left-and-right direction around the roll axis. Furthermore, the yaw angle means a turning angle of the vehicle body 3 in a horizontal plane around the yaw axis.

The control device 40 performs a certain arithmetic process and outputs necessary control signals to the left and right wheel drive circuits 31L and 31R to control the driving of the left and right wheel drive units 5L and 5R based on the detecting signal from the attitude detecting unit 32, the detecting signal from the turning state detecting device 37 of the manipulation ring, the detecting signal from the turning angle detecting devices 24L and 24R of the left and right assisting turning members, and similar signals. The control device 40 includes, for example, an arithmetic circuit 41 having a microcomputer (CPU), a storage device 42 having a program memory, a data memory, a RAM, a ROM, and the like. A power supply 44 and the left and right wheel drive circuits 31L and 31R are connected to the control device 40, and they are also connected with each other through an emergency stop switch 45.

The left and right wheel drive circuits 31L and 31R are used to separately control the rotation speed and rotation direction of the left and right wheels 4L and 4R, and separately connected to the left and right wheel drive units 5L and 5R. Each of the wheel drive units 5L and 5R has an angle detecting device for detecting a rotation angle of its own driving motor. Detecting signals indicating the states of their respective wheels 4L and 4R are supplied from these angle detecting devices to the control device 40.

As explained above, the detecting signals from the turning angle detecting devices 24L and 24R that detect the turning angles, i.e., gradient angles of the left and right assisting turning members 15 and 15, the detecting signal from the turning state detecting device 37 that detects the amount of the turning operation of the rotatable manipulation ring 11, and the detecting signal from the attitude detecting unit 32 that detects the pitch, roll, and yaw angles, acceleration and the like of the vehicle body 3 are supplied to the control device 40 so that control device 40 controls the driving of the left and right wheels 4L and 4R. The control device 40 performs a certain arithmetic process, and controls the number of rotation and the rotation direction of the left and right wheels 4L and 4R to control the straight traveling and curving behavior of the vehicle with two parallel wheels 1 in a stabilized manner.

FIG. 7 is a flowchart for preventing the free-spinning of the wheels 4L and 4R during step run-on action. The control program shown in FIG. 7 is, for example, performed by an interruption process. Incidentally, since the left and right step run-on assist mechanisms 8L and 8R corresponding to the left and right wheels 4L and 4R are identical to each other except that they are left-right symmetrical to each other, the difference between left and right is omitted in the following explanation.

At the initial state of step S1, the angel velocities of the motors of the wheel drive units 5L and 5R and the initial mounting angles (initial positions) of the assisting turning members 15 of the step run-on assist mechanisms 8L and 8R are detected. In this case, the angel velocity of the motor is detected by the detecting signal from a motor angle detecting device, and it is expressed by the equation: Motor angel velocity $Mvel\_0 = \omega\_0$. Furthermore, the initial mounting angle (initial position) of the assisting turning member 15 is detected by the turning angle detecting devices 24L and 24R, and it is expressed by the equation: Assisting turning member angle $Rpos\_0 = \theta r\_0$. In this case, the mounting angle of the assisting turning member 15 measured in a counterclockwise direction in FIG. 2A is assumed to be a positive angle.

Then, at step S2, information about the state of motor (motor angle velocity $\omega\_n$) and the states of the assisting turning member 15 (assisting turning member angle $\theta r\_n$) are obtained at sampling intervals $\Delta t$ during the traveling of the vehicle, and stored in the storage device 42 of the control device 40. In this case, those states are expressed by the equations: Motor angel velocity $Mvel\_n = \omega\_n$, and Assisting turning member angle $Rpos\_n = \theta r\_n$.

Next, at step S3, it determines whether or not the mounting angle of the assisting turning member 15 is changed from the initial mounting angle. This decision is made by comparing the current mounting angle $Rpos\_n$ and the initial mounting angle $Rpos\_0$ of the assisting turning member 15 to determine whether or not the current mounting angle is different from the initial state. That is, it detects whether or not the contact portion 21 contacted a step on the road surface and started the turning action of the assisting turning member 15. In this case, if the contact portion 21 of the assisting turning member 15 contacts a step, the transfer of the total weight (vehicle weight+driver's weight) from the wheels 4L and 4R to the assisting turning member 15 begins. Therefore, it can determine whether or not the lifting state of the wheels 4L and 4R is occurring. In this decision, if the mounting angle of the assisting turning member 15 is at the same state as the initial state, it returns to the step S2. On the other hand, if the mounting angle of the assisting turning member 15 is different from the initial state, it proceeds to step S4.

At the step S4, since the step run-on action is performed by using the step run-on assist mechanisms 8L and 8R, the rotation of the wheels 4L and 4R should be regulated. The wheel rotation regulation reduces the driving force of the wheels 4L and 4R because the mounting angle of the assisting turning member 15 is changed ($Rpos\_0 < Rpos\_n$) and the wheels 4L and 4R become the lifting state by the contact of the assisting turning member 15 to the step. At this step S4, firstly, the mounting angle $Rpos\_n$ of the assisting turning member 15 is detected, and the detected value is substituted into the equation (1) to calculate motor angle velocity $Mvel\_n$ to be regulated.

$$Mvel\_n = Mvel\_n \times (1 - (1/km) \times Rpos\_n))  \quad \text{[Equation 1]}$$

In the equation 1, km is a coefficient determined in advance such that the rotation speed of the wheels 4L and 4R becomes equal to or less than the rotation speed at the time of the collision. The mounting angle $Rpos\_n$ is multiplied by the reciprocal of such coefficient km, and the multiplied value is subtracted from 1. Then, motor angle velocity $Mvel\_n$ is multiplied by the resulting value. By substituting this new motor angle velocity $Mvel\_n$ for the original one, the motor angle velocity $Mvel\_n$ is regulated to the new motor angle velocity $Mvel\_n$, which is equal to or less than the original motor angle velocity at the time of the collision, in order to control the driving of the wheels 4L and 4R. Then, it returns to the step S2, and the processes from the step S2 through the step S4 are repeated.

The vehicle with two parallel wheels 1 having such structure travels, for example, in the following manner. FIGS. 4A-4C are explanatory diagrams showing a case where the vehicle 1 runs into a step ST at high speed higher than a predetermined speed high enough to clear a step (high speed traveling state). When the contact portion 21 of the assisting turning member 15 collides the step ST as shown in FIG. 4D, the damper 17 generates large drag force, and the piston rod 26 becomes a substantially locked state. In this manner, the damper 17 is retained at the existing position, and likewise, the link member 16 is held at the existing position with the existing attitude. Therefore, the external force which is caused by the collision and exerted from the step ST to the assisting turning member 15 is sustained by the link member 16 which is firmly held as one side of generally triangular configuration formed with the split steps 2L and 2R.

Therefore, as shown in FIG. 4A, the assisting turning member 15 is turned in a counterclockwise direction around the supporting shaft 24 formed on the link member 16 by the external force caused by the collision to the step ST. As shown in FIG. 4B, the wheels 4L and 4R are raised from the ground by this turning action of the assisting turning member 15, and contact the step ST in this raised position. As a result, as shown in FIG. 4C, the rotation force of the wheels 4L and 4R is transferred to the step ST, and the wheels 4L and 4R completely run on the step ST by their rotation force. When the wheels 4L and 4R completely run on the step ST, the contact portion 21 of the assisting turning member 15 is detached from the step ST, and the supporting force to the assisting turning member 15 by the step ST disappears.

Therefore, the assisting turning member 15 is retunes to the original position by the tensile force of the coil spring 18, in which it is pulled to a forward direction of the vehicle.

During this step run-on action, the wheels 4L and 4R temporally become the lifting state. However, the rotation speed of the wheels 4L and 4R is controlled to or below the rotation speed at the time of the collision to the step by the execution of a wheel free-spinning prevention program as explained above. Therefore, it can prevent the wheels 4L and 4R from spinning freely at high speed by the prevention of the free-spinning of the wheels 4L and 4R. In this manner, when the assisting turning member 15 collides to a step ST at speed equal to or higher than a predetermined speed S1, the step run-on assist mechanisms 8L and 8R are used, and thereby it can run on the step ST even if the wheel drive force is relatively small.

On the other hand, FIGS. 5A-5C are explanatory diagrams showing a case where the vehicle 1 runs into a step ST at low speed lower than a predetermined speed incapable of clearing a step (low speed traveling state, or at the start of traveling). When the contact portion 21 of the assisting turning member 15 collides the step ST, as shown in FIG. 5D, the drag force to the damper 17 is small owing to the slow collision speed, and is not large enough to retain the link member 16. Therefore, as shown in FIG. 5B, the piston rod 26 retreats within the cylinder 25, and the total length of the damper 17 becomes shorter. In this manner, the link member 16 is turned in a counterclockwise direction around the turning shaft 23 in FIG. 5A, and the supporting shaft 24, which is supporting the assisting turning member 15, is raised upward. As a result, the difference between the heights of both sides of the circular arc in the contact portion 21 of the assisting turning member 15, which turns around the supporting shaft 24, becomes substantially zero, and the assisting turning member 15 turns in a backward direction without causing large resisting force.

Therefore, in the case of low speed, the wheels 4L and 4R continue to travel by directly transferring the driving force to the road surface without using the step run-on assist mechanisms 8L and 8R, and collide to the step ST. As a result, the wheels 4L and 4R directly run on the step ST by the rotation force of the wheels 4L and 4R rotated by the wheel drive units 5L and 5R. Then, when the wheels 4L and 4R completely run on the step ST, the contact portion 21 of the assisting turning member 15 is detached from the step ST, and the supporting force to the assisting turning member 15 by the step ST disappears. Therefore, the assisting turning member 15 is retunes to the original position by the tensile force of the coil spring 18, in which it is pulled to a forward direction of the vehicle.

Accordingly, at low speed or at the start of traveling, the vehicle runs on a step ST by the driving force of the wheels 4L and 4R alone. On the other hand, when the collision speed to a step ST is equal to or larger than a predetermined speed, the vehicle can easily run on the step ST by using the step run-on assist mechanisms 8L and 8R with relatively small driving force, causing a minimal collision impact.

As explained above, when a vehicle with two parallel wheels that runs with parallel-arranged two wheels runs on a step, in general, all wheels run on the step simultaneously. Therefore, it requires enough driving force in the power source to run on a step with the total weight of the vehicle with two parallel wheels and the driver, and requires driving torque three or four times as large as that needed when driving on a flat place. In contrast to this, in a vehicle with two parallel wheels in accordance with one aspect of the present invention, the step run-on assist mechanisms 8L and 8R can reduce the large torque that is required only for step run-on action, and thereby it can reduce the size of the apparatus as a whole including the driving motor, and also reduce the energy consumption.

Furthermore, from the standpoint of riding comfort, it reduces the height of a step felt by the driver since the assisting turning member is located at higher position than the driving wheel in a vehicle with two parallel wheels in accordance with in one aspect of the present invention. Moreover, since the assisting turning member, which has a large radius (curvature radius of arc-shaped support surface), is used to run on a step, it can run on a step more smoothly. From the standpoint of traveling performance, this structure also allows the vehicle with two parallel wheels to run on a step higher than the height determined by the diameter of the driving wheel.

Although certain embodiments are explained, the present invention is not limited to those embodiments. For example, a substantially rectangular-shaped housing is used as the vehicle body in the embodiments explained above, the vehicle body may be composed of two parallel-arranged board elements forming a parallel linkage type vehicle body. Furthermore, gripping portions configured in U-shape are used for the handle in the above explanation, straight type gripping portions may be used for the handle. Furthermore, gripping portions forming an oval-shape, circular-shape, or other shapes may also be used for the handle. Furthermore, although the step run-on assist mechanism is mounted on the step base in above embodiments, the step run-on assist mechanism may be mounted on the vehicle body. As stated above, various modifications may be made to the embodiments without departing from the spirit and scope of the present invention.

INDUSTRIAL APPLICABILITY

The present invention relates to a wide range of vehicles with two parallel wheels that run with two parallel-arranged wheels. In particular, the present invention is applicable to vehicles with two parallel wheels equipped with a step run-on assist mechanism to facilitate step run-on action.

The invention claimed is:

1. A vehicle with two parallel wheels comprising:
   a step base where a driver rides on;
   a vehicle body for supporting the step base;
   a pair of wheels coaxially arranged in parallel to each other and rotatably supported on the vehicle body;
   a pair of wheel drive portions for independently rotating the pair of wheels; and
   a pair of step run-on assist mechanisms configured to change an amount of assistance of run-on action to a step provided by the run-on assist mechanisms depending on a collision speed to the step, each of the pair of step run-on assist mechanisms being provided for each of the pair of wheels;
   wherein each of the pair of step run-on assist mechanisms includes:
   an assisting turning member having a circular support surface of a curvature radius larger than that of the wheels, a turning center of the assisting turning member being arranged ahead of a rotating center of the wheels in the vehicle with respect to a travel direction of the vehicle;
   a link member that rotatably supports the assisting turning member such that a rotation axis of the assisting turning member is perpendicular to the travel direction of the vehicle, one end of the link member being rotatably supported on the step base or the vehicle body; and a retaining force changing device that changes an amount of a force that acts on another end of the link member depending on the collision speed of the assisting turning member to the step.

2. The vehicle with two parallel wheels of claim 1, wherein the retaining force changing device is a damper, and the damper holds the link member at an existing position when the collision speed of the assisting turning member to the step is equal to or higher than predetermined speed, and reduces the retaining force for the link member and allows a turning motion of the link member when the collision speed is lower than the predetermined speed.

3. The vehicle with two parallel wheels of claim 1 further comprising a biasing member for pulling the assisting turning member to the travel direction of the vehicle.

4. The vehicle with two parallel wheels of claim 1 further comprising a turning angle detecting device for detecting a turning angle of the assisting turning member and outputting an angle detection signal.

5. The vehicle with two parallel wheels according to claim 1, further comprising:
a first bearing portion is arranged at one end of the link member to rotatably support the link member to the step base or the vehicle body;
a second bearing portion is arranged at a middle region of the link member to rotatably support the assisting turning member; and
a third bearing portion is arranged at the another end of the link member to rotatably support the retaining force changing device.

6. The vehicle with two parallel wheels according to claim 5, wherein a first longitudinal axis of the link member between the first bearing portion and the second bearing portion is formed at an angle with respect to a second longitudinal axis of the link member between the second bearing portion and the third bearing portion.

7. The vehicle with two parallel wheels according to claim 6, wherein the retaining force changing device is angled with respect to the step base in the travel direction of the vehicle, and the first and second longitudinal axis are angled with respect to the step base in a direction opposite from the travel direction of the vehicle.

8. The vehicle with two parallel wheels according to claim 1, further comprising covers arranged on an outside of the step run-on assist mechanisms.

9. The vehicle with two parallel wheels according to claim 1, further comprising an attitude detecting device that detects an attitude of the vehicle body, the attitude detecting device including at least one of a pitch angle detecting device, a roll angle detecting device, a yaw angle detecting device, and an accelerometer.

* * * * *